March 7, 1961   G. F. BOSL ET AL   2,973,532
AUTOMATIC LOADING AND UNLOADING MECHANISM
Filed Feb. 27, 1958   6 Sheets-Sheet 1

INVENTORS
GEORGE F. BOSL,
GILBERT J. JANKE &
JOSEPH EVANS, JR.
BY *Oberlin & Limbach*
ATTORNEYS

FIG. 3

INVENTORS
GEORGE F. BOSL,
GILBERT J. JANKE &
JOSEPH EVANS, JR.
BY
Oberlin & Limbach
ATTORNEYS March 7, 1961 G. F. BOSL ET AL 2,973,532
AUTOMATIC LOADING AND UNLOADING MECHANISM
Filed Feb. 27, 1958 6 Sheets-Sheet 6

INVENTORS
GEORGE F. BOSL,
GILBERT J. JANKE &
JOSEPH EVANS, JR.
BY
Oberlin & Limbach
ATTORNEYS

United States Patent Office 2,973,532
Patented Mar. 7, 1961

2,973,532
AUTOMATIC LOADING AND UNLOADING MECHANISM

George F. Bosl and Gilbert J. Janke, Parma, and Joseph Evans, Jr., Maple Heights, Ohio, assignors to The Osborn Manufacturing Company, Cleveland, Ohio, a corporation of Ohio Filed Feb. 27, 1958, Ser. No. 717,987
9 Claims. (Cl. 15—21)

The present invention, while relating generally as indicated to an automatic loading and unloading mechanism, is more particularly concerned with an automatic loading and unloading mechanism for use with a power brushing machine or the like.

It is known in the power brushing art, as disclosed, for example, in B. E. Nelson et al. Patent No. 2,682,065, dated June 29, 1954, to employ a reciprocable workpiece holder that is operative, when advanced toward the rotary power-driven brush of a brushing lathe, to present a workpiece gripped thereby to the brush for performance of various surface-finishing operations such as polishing, the removal of burrs, the removal of scale, oxide, or other coatings, the breaking of sharp corners, etc. When a large number of identical workpieces are thus to be operated upon, it has been found that automatic feeding, chucking, advancement and retraction of chucked workpieces relative to the tool (a brush herein), and discharging of finished workpieces from the work holder greatly increases the productive capacity of the brushing lathe as compared with its capacity when the work holder is manually loaded and unloaded. Moreover, when automatic cycling, as aforesaid, is coupled with a timing control, uniform working of the workpieces is assured.

It is a main object of the present invention to provide an automatic loading and unloading mechanism in which the workpieces to be operated upon by a tool such as a brush are chucked, advanced to and retracted from the work station, and discharged automatically without any handling of the workpieces by the machine operator.

It is another object of this invention to provide an automatic loading and unloading mechanism which is set into motion to perform the chucking, and the advancing and retracting operations only after a workpiece has been loaded properly onto the work support of the mechanism.

It is another object of this invention to provide an automatic loading and unloading mechanism that has a rotary work holder that is effective to rotate the workpiece gripped thereby while in contact with a rotary, power-driven brush or like tool at the work station.

It is another object of this invention to provide an automatic loading and unloading mechanism which has a novel sequence and timer control system associated therewith.

It is another object of this invention to provide an automatic loading and unloading mechanism in which a series of workpieces in a supply chute are gravity fed therefrom, one by one, to the work holder.

It is another object of this invention to provide an automatic loading and unloading mechanism which has associated therewith a novel escapement mechanism which holds back the second one of a series of workpieces in a supply chute when the first workpiece has been released to the work support of the work holder and until the work holder has returned to its starting position ready to grip the second workpiece.

It is another object of this invention to provide an automatic loading and unloading mechanism which has a novel form of workpiece stripper for stripping of a completed workpiece from the work holder chuck as an incident of the retraction movement of the work holder.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figures 1, 2:
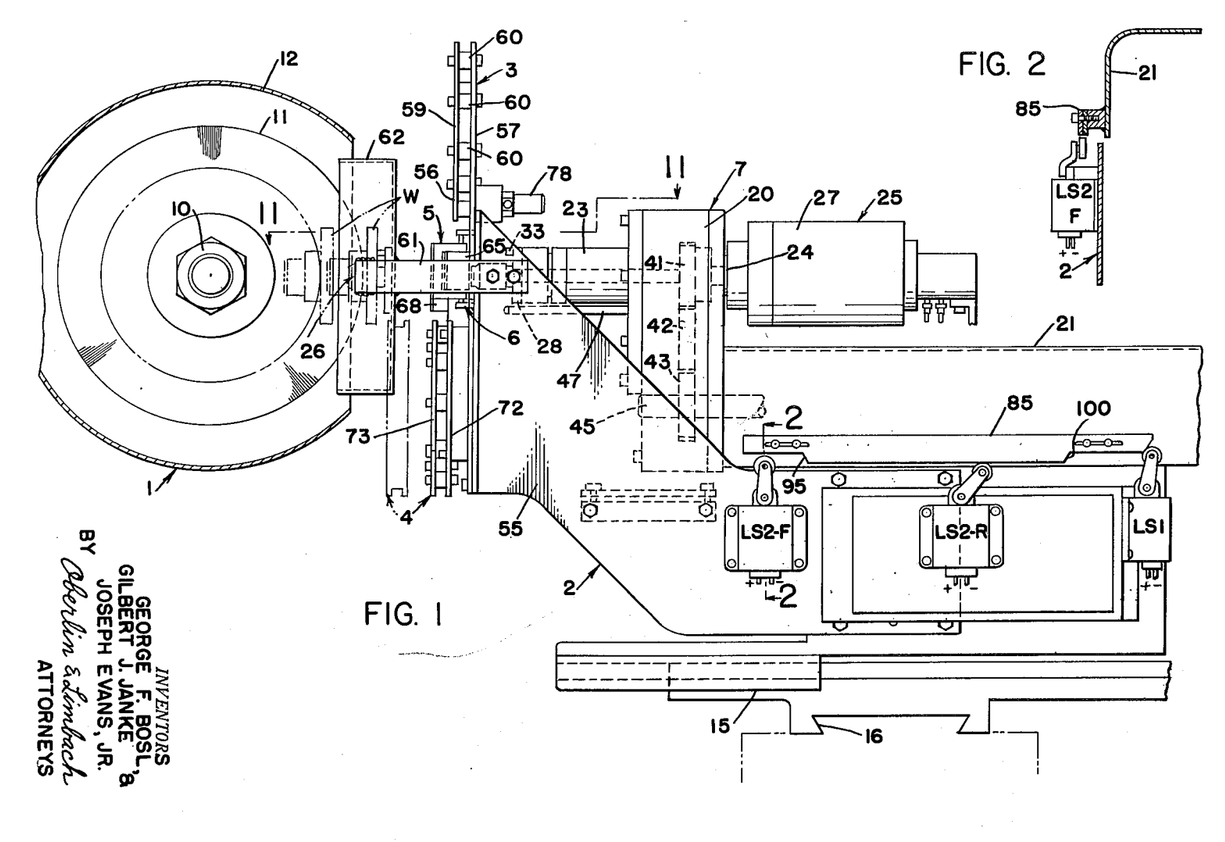
Fig. 1 is a side elevation view, partly in cross-section, of one embodiment of the present invention.
Fig. 2 is a fragmentary cross-section view taken substantially along the line 2—2, Fig. 1.

Referring first to Fig. 1, it will be evident therefrom that the present invention, as herein disclosed, essentially comprises a brushing lathe 1; a base 2 which carries a workpiece supply chute 3, a workpiece discharge chute 4, a stripper 5, and a work support 6; and a work holder 7 that is reciprocably mounted on the base 2 to grasp a workpiece W on the support 6, to advance the workpiece to the work station (the brushing lathe 1), and to retract the brushed workpiece away from the work station. The stripper 5, as explained in detail hereinafter, is operative during such retraction of the workpiece W by the work holder 7 to strip the workpiece from the work holder for discharge into the discharge chute 4.

With the foregoing as a general background of the main components of this invention the structure and operation of the automatic loading and unloading mechanism, in combination with the brushing lathe 1, will now be discussed in detail under the following headings:

I. The Brushing Lathe;
II. The Base;
III. The Work Holder;
IV. The Supply and Discharge Chutes and the Stripper; and
V. The Automatic Control Circuit.

I. *The brushing lathe (Fig. 1)*

The brushing lathe 1 may be of familiar form including a power-driven brush arbor 10 on which a rotary brush 11, is mounted, and a brush hood or guard 12 which is open toward the work holder 7.

When it is desired to brush flanged workpieces W such as stepped gears or gears with integral hubs as are herein illustrated by way of example, the brush 11 may comprise axially spaced-apart sections as contemplated in the Nelson et al. Pat. No. 2,682,065. Obviously, the longitudinal axis of the arbor 10 and brush 11 thereon need not be perpendicular to the axis of the workpiece W as shown, but may be skewed or otherwise positioned, so that the periphery of the brush 11 will engage any surfaces of the workpiece W which it is desired to brush.

In any event, the prime requisite is that the workpiece W be presented to the brush 11 to effect de-burring, polishing, or other operations on particular surfaces thereof. Although the working tool herein is a rotary, power-driven brush 11 it is contemplated, in the broader aspects of the invention, to employ other tools such as buffing, grinding, or polishing wheels, cutting tools, etc. Accordingly, the advanced position of the work holder 7 and of the workpiece W gripped thereby is hereinafter sometimes called the "work station" at which the brush 11 or other tool performs its working operations on the workpiece.

II. *The base (Figs. 1, 2, 6 and 11)*

The base 2 which carries the loading and unloading mechanism (the chutes 3 and 4, the support 6, and the stripper 5) and on which the work holder 7 is reciprocably mounted constitutes an adjustable portion of a suitable standard or frame that has angularly related dovetail slides 15 and 16 along which the base 2 may be adjustably positioned toward the brush axis to compensate for brush wear and longitudinally of the brush axis to distribute brush wear in the case of long cylindrical brushes or to effect contact of different sections of the brush with certain surfaces of the workpiece W. The full line position of the base 2 in Fig. 1 represents its initial position when the brushing lathe 1 is equipped with a new brush 11 and the dotted-line position of chute 4 represents its advanced position when the brush 11 has become worn to the diameter shown in dotted lines. Incremental advance of base 2 to compensate automatically for brush wear may be effected as by mechanisms disclosed in the following: U. S. Patent application of Lyndon C. Cole, Serial No. 679,720, filed August 22, 1957, now Patent No. 2,909,015, issued October 20, 1959, entitled "Power Brushing Machine."

III. *The work holder (Figs. 1, 3, 4, 5, 11 and 12)*

Figure 3:
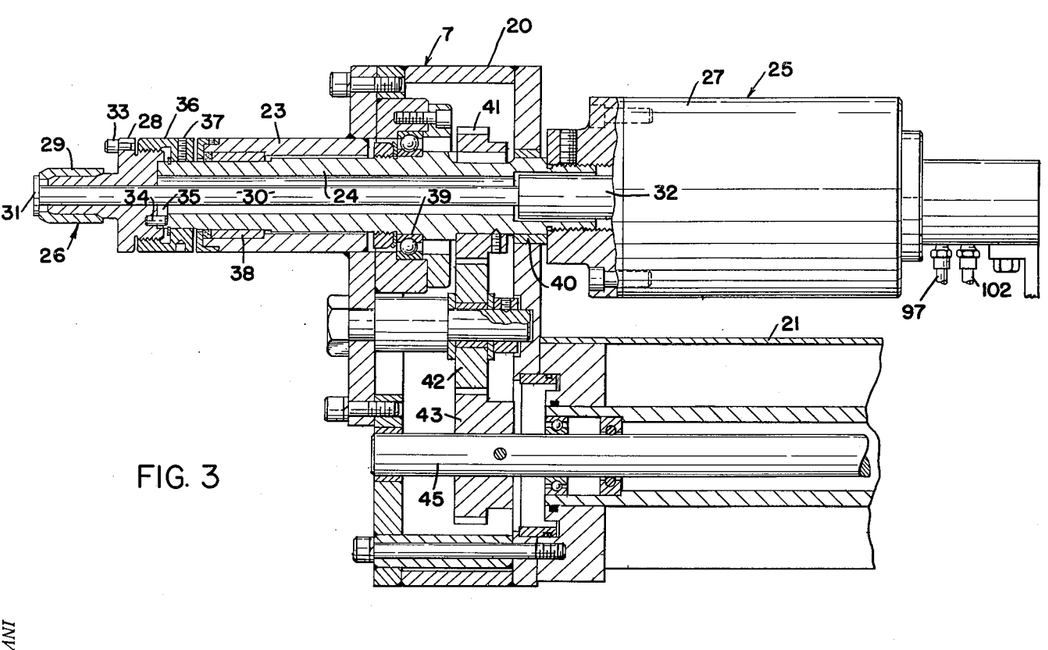
Fig. 3 is a vertical cross-section view of the work holder showing an expansible chuck or mandrel for internally gripping a workpiece and showing drive means for rotating the chuck about its longitudinal axis.
Figure 4:
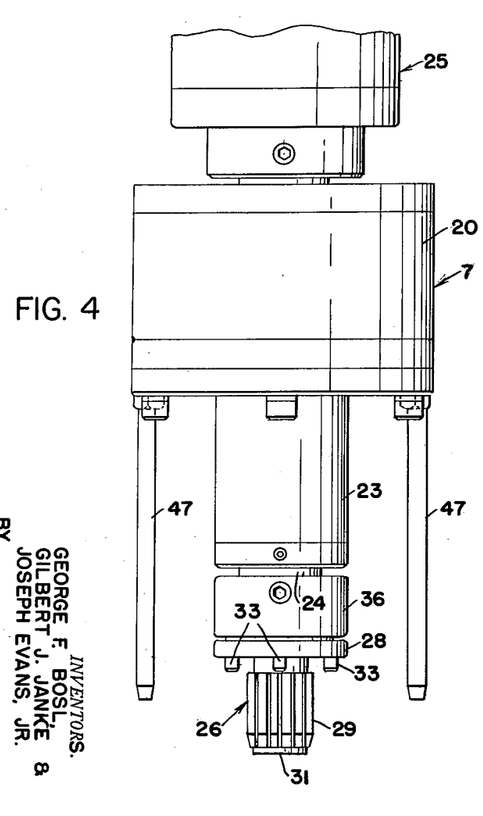
Fig. 4 is a top plan view of the work holder as viewed from the top of Fig. 3.
Figure 5:
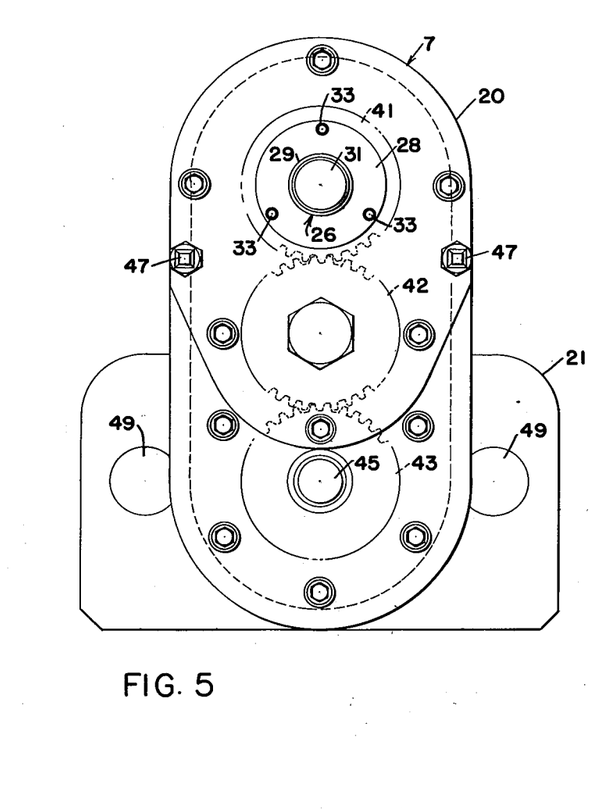
Fig. 5 is a front elevation view of the work holder as viewed from the left-hand side of Fig. 3.

As best shown in Fig. 3, the work holder 7 comprises an upright hollow casing 20 bolted or otherwise secured to a slide member 21 that extends rearwardly above the base 2 and parallel to the dovetail slide 15 of base 2. Journalled in the upstanding portion of casing 20 and in the forwardly extending projection 23, and extending horizontally therethrough, is a tubular chuck shaft 24 to the rear end of which a chuck actuating motor 25 is secured and to the front end of which a workpiece gripping chuck 26 is secured. The motor 25 is preferably of the double acting piston-cylinder type to the cylinder 27 of which the end of shaft 24 is secured as shown.

The chuck 26 at the front end of shaft 24 may be of any familiar type, for instance, one which comprises a chuck body 28 on which an expanding mandrel sleeve 29 is positioned with its internal frusto-conical surfaces in engagement with complementary frusto-conical surfaces formed on the chuck body. Expansion of sleeve 29 to internally grip a workpiece W is effected as by means of a draw rod 30, the head 31 of which engages the end of sleeve 29. The rear end of draw rod 30 is connected with the piston 32 of motor 25 and, as apparent, when the rod 30 moves rearward, the sleeve 30 is expanded, and when the rod 30 moves forward, the sleeve 30 is free to contract out of gripping engagement with the workpiece W. The chuck body 28 is provided with a series of forwardly projecting locating pins 33 against the ends of which the rear face of the workpiece W is adapted to be engaged to position that face of the workpiece W perpendicular to the axis of the chuck 26.

The chuck 26 is detachably mounted on the chuck shaft 24 as by means of a pin 34 and slot 35 connection and a collar 36 threadedly engaged with the chuck body 28, the collar 36 being locked on shaft 24 by the setscrew 37. Thus, different sizes or types of chucks may be mounted on the chuck shaft 24 for chucking different sizes or shapes of workpieces.

The chuck shaft 24 is journalled in the bearings 38, 39, and 40 and has keyed thereon a gear 41 which meshes with an intermediate gear 42 which in turn meshes with the drive gear 43 on the motor driven shaft 45. The drive shaft 45 extends rearward through slide member 21 and may be driven by means such as shown in the Nelson et al. Pat. No. 2,682,065.

Projecting forwardly from the casing 20 on opposite sides of the chuck 26 are a pair of rods 47, preferably of square cross-section and tapered at their front ends. The function of these rods 47 will be discussed in detail under the next main heading (IV).

The work holder 7 is advanced toward and retracted away from the brushing lathe 1 as by means of a double acting fluid motor 48 (see Fig. 12), the slide member 21 being slidably mounted on parallel bars 49. The reciprocation of the work holder 7 may be effected as disclosed clearly in the aforesaid Nelson et al. patent.

In operation, and for use in connection with a workpiece W having a center hole therein, the slide member 21, together with the work holder 7 will be advanced axially (toward the left as viewed in Figs. 1 and 3), to cause the chuck 26 to enter the hole in the workpiece W until the pins 33 abut the rear face of the workpiece. At that stage of the forward or advance movement of the chuck 26, the chucking motor 25 will be actuated to move the draw rod 30 rearward (toward the right or rear as viewed in Figs. 1 and 3) thereby to expand the sleeve 29 into gripping engagement with the workpiece W. Continued advance of the work holder 7 brings the chucked workpiece W to the work station whereat it contacts the rotary power-driven brush 11. In the case of a flanged workpiece W as herein shown, the brush 11 may comprise axially spaced sections that stradle the boss of the workpiece. Here, too, the workpiece W should be rotated about its center axis to achieve uniform brushing action on the front face of the flange, such driving of the workpiece being effected by drive shaft 45 and the gear train 43, 42, 41 as already described.

IV. *The Supply (Or feed) and Discharge chutes and the Stripper (Figs. 1, 6, 7, 8, 9, 10 and 11)*

Figures 6, 7, 8:
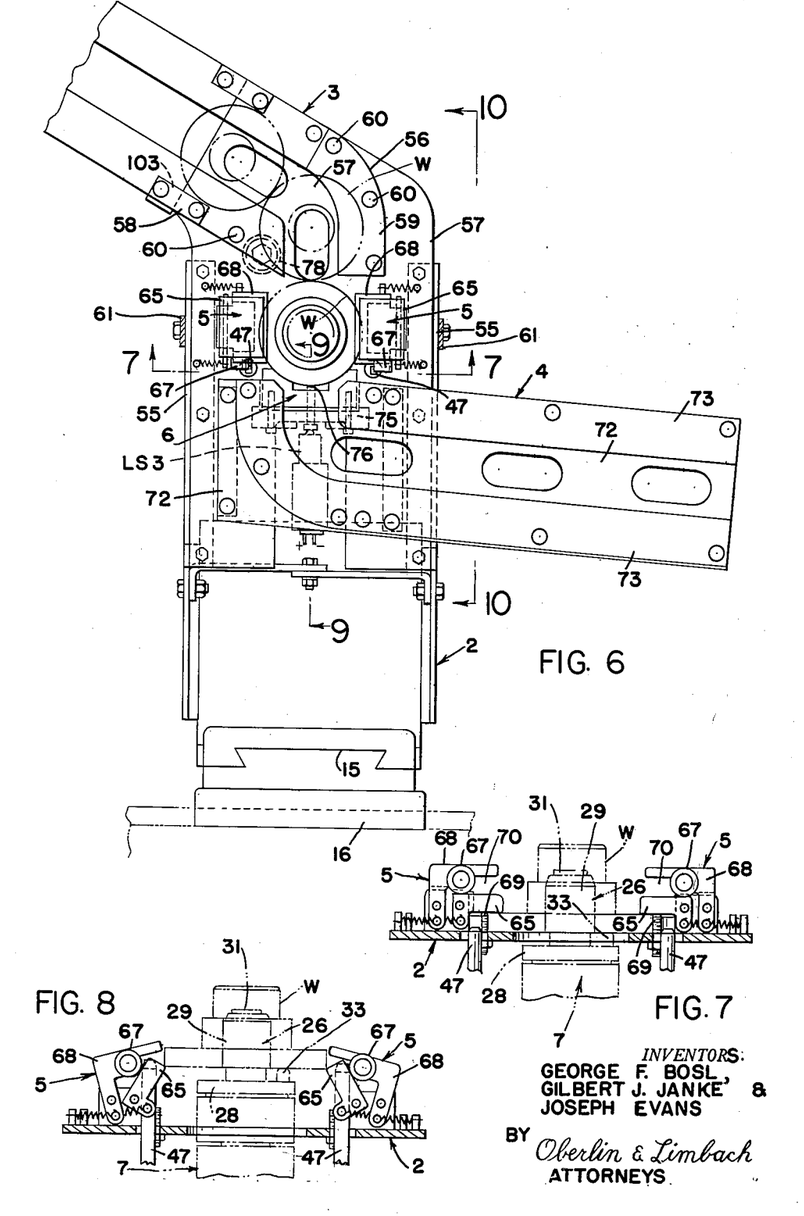
Fig. 6 is a front elevation view, on enlarged scale, of the workpiece supply and discharge chutes, the workpiece support, and the stripper as viewed from the left-hand side of Fig. 1.
Fig. 7 is a cross-section view of the stripper taken substantially along the line 7—7, Fig. 6.
Fig. 8 is the same as Fig. 7 except that the stripper parts are shown in the positions that they assume as the chuck and workpiece held thereby are advanced toward the work station.

*a.* The Supply Chute: The base 2 previously referred to has secured thereto a pair of side plates 55 that extend upwardly and forwardly from the base 2 so as to straddle the chuck 26. Secured to the side plates 55 in vertical position is the lower end portion 56 of the downwardly inclined supply chute 3. The chute 3, including portion 56 thereof, comprises a rear plate 57 which may be apertured for weight reduction and front plates 58 and 59 that are secured to said rear plate 57 with intervening spacers 60 to define tracks for the flange of the workpiece W. The inner edges of the front plates 58 and 59 are spaced apart to correspond approximately with the diameter of the boss of the workpiece W. The supply chute 3 proper is downwardly inclined, as best shown in Fig. 6, and a series of workpieces W may be placed therein for delivery one at a time from the lower end of portion 56 onto the saddle-like workpiece support 6 having an arcuate surface of radius equal to the radius of the workpiece flange upon which the workpiece rests when thus delivered from the portion 56 of the supply chute 3.

Projecting forwardly from the respective side plates 55 are bars 61 that mount a guard 62 disposed about the workpiece W when the latter is advanced to engage the periphery of the brush 11.

*b.* The Stripper: When a workpiece W drops down from the lower end portion 56 of the supply chute 3 onto the support 6, diametrically opposite portions of the flange thereof are disposed behind the rear pair of spring actuated, swingably mounted parts or gates 65 of the stripper 5. Thus, when the collapsed chuck 26 enters the center hole of the workpiece W the pins 33 on the chuck body 28 will engage the rear face of the workpiece W and as the workpiece W and chuck 26 continue to advance, the rear parts 65 will resiliently press the rear face of the workpiece against the pins 33 to accurately position the rear face of the workpiece in a plane perpendicular to the axis of the chuck 26. Thereafter the chuck 26 will be expanded to grip the workpiece W. The chuck 26 and the workpiece W gripped thereby are shown in further advanced position in Fig. 8, the cam rods 47, at that time, being engaged with the rollers 67 of the front pair of spring-actuated, swingably mounted stripper parts or gates 68 to swing the latter so as to clear the flange of the workpiece W. The flange of the workpiece itself swings the rear parts 65 outwardly. As soon as the flange of the workpiece W moves past the rear parts 65, they are swung in by their springs to the positions shown in Fig. 7 in engagement with the stop pins 69.

The chuck 26 and workpiece W are advanced to present desired surfaces of the workpiece W to the brush 11 to effect burr removal or to perform other surface finishing operations thereon.

Now, as the chuck 26 and workpiece W are retracted away from the brush 11, the rear parts 65 will be in the path of the retraction movement of the workpiece W whereby if, at that time or just before, the chuck 26 is released from the workpiece, the continued retraction movement of the chuck 26 will effect stripping of the brushed workpiece W from the chuck. During this part of the retraction movement, the cam rods 47 will control the inward swinging of the front parts 68 so as to overlie the front face of the workpiece flange. The workpiece flange, therefore, will be disposed in the space 70 between the respective pairs of rear and front stripper parts 65 and 68.

*c.* The Discharge Chute: The discharge chute 4 may be of the same general construction as the supply chute 3, that is, it comprises a rear plate 72 and front plates 73 to form tracks for the flange of the workpiece W, the inner edges of the front plates being spaced apart a distance approximately equal to the diameter of the boss of the workpiece.

When the workpiece W has been stripped from the chuck 26 with its flange disposed in the spaces 70 between the stripper parts 65 and 68, it will be aligned with the upper end of the discharge chute 4 and will drop down thereinto for gravity movement away from the machine.

Figures 9, 10, 11:
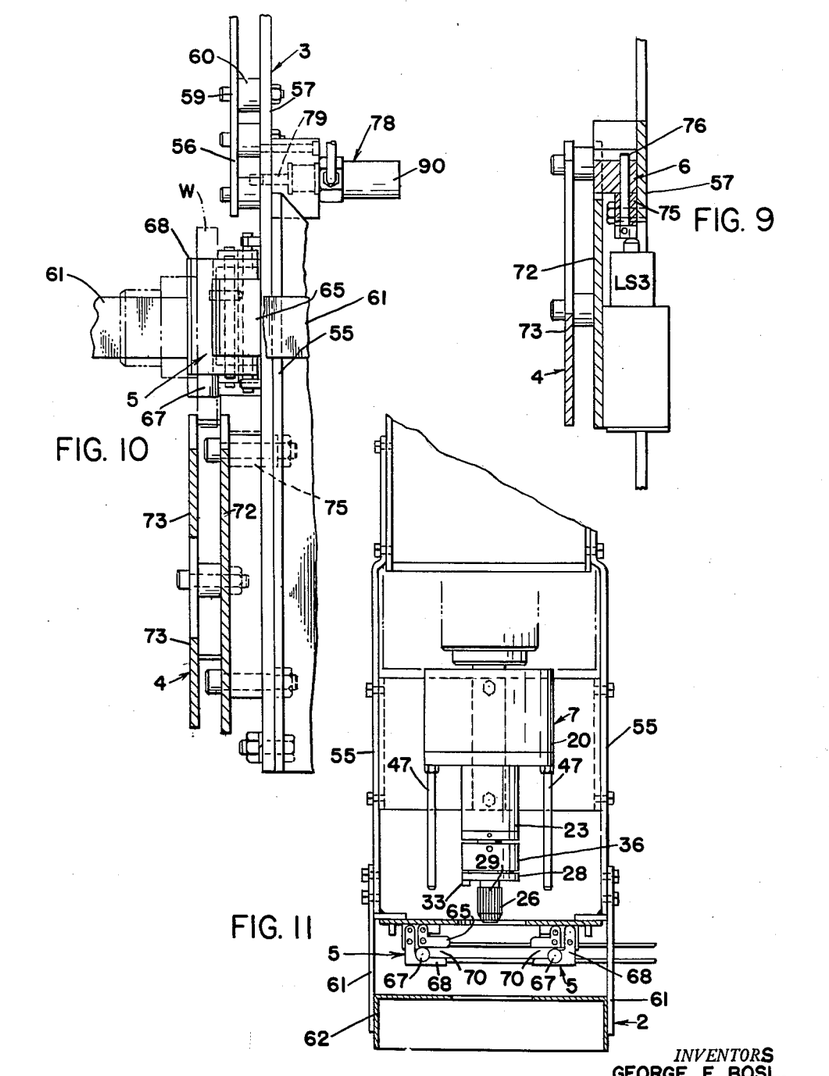
Fig. 9 is a cross-seciton view taken substantially along the line 9—9, Fig. 6.
Fig. 10 is a cross-section view taken substantially along the line 10—10, Fig. 6.
Fig. 11 is a horizontal cross-section view as viewed along the line 11—11, Fig. 1.

*d.* Workpiece Support and Escapement Mechanism: As best shown in Figs. 6, 9, and 10 the workpiece support 6 is detachably mounted on a cross bar 75 and has associated therewith a switch actuating plunger 76 which, when actuated by a workpiece W resting on the support, is effective to cause actuation of an escapement mechanism 78 to project the pin 79 thereof into the path of the next workpiece W so as to hold it in supply chute portion 56 until the chuck 26 has completed the successive advance and retract movements. At the end of the retraction movement of the chuck 26, the escapement pin 79 is automatically withdrawn to allow the workpiece W to drop down onto support 6 and when that occurs, the plunger 76 again is actuated to cause the escapement pin 79 to be thrust forwardly into the path of the next following workpiece.

V. *Automatic control circuit (Figs. 12 and 13)*

Figure 12:
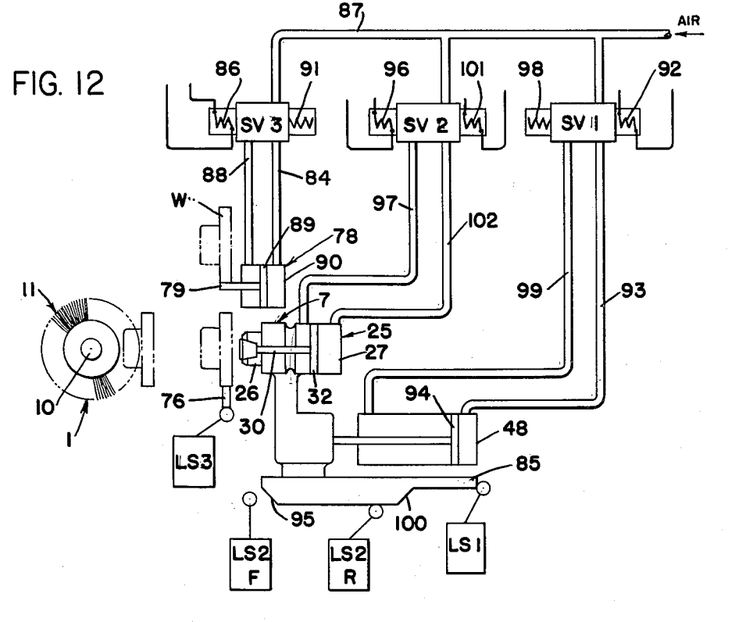
Fig. 12 is a schematic piping diagram showing the locations of the electrical control components by which automatic operation of the loading and unloading mechanism is achieved.
Figure 13:
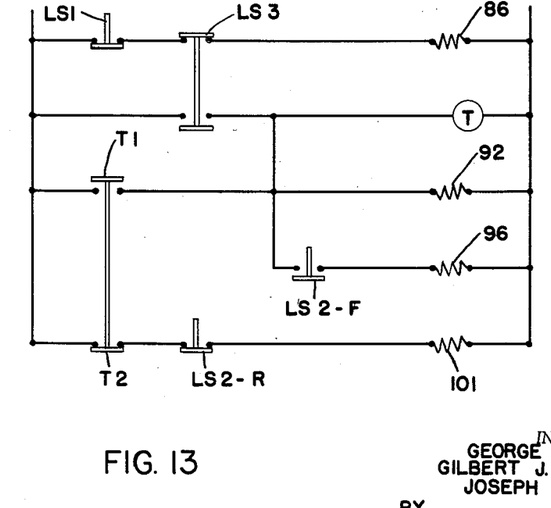
Fig. 13 is a schematic wiring diagram showing how the electrical components of Fig. 12 are interconnected.

The automatic control circuit may best be explained in structure and in operation by following through one complete cycle of operation of the automatic loading and unloading mechanism while referring to Figs. 12 and 13 and also to other appropriate figures.

First, assuming that the chuck 26 of the work holder 7 is in its fully retracted position, the rear end of the cam bar 85 on slide 21 will have actuated the limit switch LS1 to closed position whereby the solenoid 86 of four-way, spring return, solenoid valve SV3 will be energized through the upper normally closed contact of limit switch LS3. When the solenoid valve SV3 is thus actuated, air under pressure from supply line 87 flows through line 88, moves the piston 89 toward the right in the cylinder 90 of the escapement mechanism 78, as viewed in Fig. 12, to retract the escapement pin 79 out of the path of the workpiece W in the supply chute 3. With the escapement pin 79 thus retracted, the workpiece W will drop down from the portion 56 of the supply chute 3 onto the support 6 to move the plunger 76 down to thereby actuate limit switch LS3 to open its upper normally closed contact to deenergize the solenoid 86 of solenoid valve SV3 whereby a spring 91 in said valve actuates the valve member therein to a position allowing air under pressure from line 87 to flow through line 84 into the right-hand end of the cylinder 90 to thus force the piston 89 and escapement pin 79 toward the left into the path of the next succeeding workpiece W. The lower normally open contact of limit switch LS3 is closed by the workpiece W resting on the support 6 and this establishes a circuit through the timer T to close its upper normally open contact T1. Accordingly, the solenoid 92 of the four-way spring returned solenoid valve SV1 is energized to shift the valve member therein to a position such that air under pressure from line 87 and through line 93 enters the right-hand end of the double acting work holder actuating motor 48 to force the piston 94 thereof and the work holder 7 forwardly toward the brush 11.

After the work holder 7 has advanced so that the chuck 26 enters the center hole of the workpiece W on support 6, a cam 95 on the cam bar thereon actuates the limit switch LS2F, closing the same and thereby establishing a circuit through the chucking solenoid 96 of the four way solenoid valve SV2 which shifts the valve member therein to allow air under pressure to flow from line 87 through line 97 into the left-hand end of the chuck actuating cylinder 27 to move the piston 32 and draw rod 30 toward the right to thereby expand the chuck 26 into gripping engagement within the center bore of the workpiece W. As the chuck 26 and the workpiece W gripped thereby, are advanced toward the brush 11, the limit switch LS3 will return to its normal condition (closed upper contact and open lower contact) and the circuits through the respective solenoids 92 and 96 of solenoid valves SV1 and SV2 are maintained through the closed contact T1 of the timer T.

The workpiece W will thus be presented to the brush 11 for performance of the desired operation thereon and for a time period as determined by the setting of the timer T.

At the end of the timer cycle, the contact T1 thereof is opened to deenergize the solenoids 92 and 96 of the solenoid valves SV1 and SV2, and the contact T2 is closed. The deenergizing of the solenoid 92 of solenoid valve SV1 permits the spring 98 to shift the valve member therein to a position such that air under pressure flows from line 87 and through line 99 into the left-hand end of the motor 48 to shift piston 94 and work holder 7 rearward to initiate retraction movement away from the brush 11.

Before the work holder 7 reaches the end of its retraction movement a cam 100 on cam bar 85 closes the limit switch LS2R to establish a circuit through the unchucking solenoid 101 of the solenoid valve SV2 which shifts the valve member therein to allow air from line 87 to flow through line 102 to move the piston 32 in the chucking cylinder 27 toward the left thus to move the draw rod 30 to the left to permit the expansible sleeve 29 of the chuck 26 to contract out of gripping engagement with the workpiece W.

At that time, or an instant thereafter, the flange of the workpiece W will engage the rear parts 65 of the stripper 5 whereby, as the work holder 7 continues its retraction movement, the chuck 26 will be withdrawn rearwardly from the workpiece W. The workpiece W is thus stripped and may then drop down into the discharge chute 4.

Finally, when the work holder 7 reaches the end of its retraction movement, the normally open limit switch LS1 is closed by the rear end of cam bar 85 to energize the solenoid 86 of solenoid valve SV3 through the normally closed upper contact of limit switch LS3 whereupon the escapement pin 79 is retracted to permit the next workpiece W to drop down onto the support 6. Such delivery of a workpiece W to the support 6 initiates another completely automatic cycle of operation of the loading and unloading mechanism in the manner just described in detail.

Accordingly, as workpieces are placed in the supply chute 3 for gravity descent, the mechanism will be automatically operative to advance the workpieces, one by one, for operation upon by the tool which, in this case, has been shown as comprising a rotary power driven brush 11 and will be retracted away from the tool and stripped by stripper 5 from the work holder 7 for discharge into the discharge chute 4. It is to be noted that if a workpiece W is not supplied to the support 6 from the supply chute 3, the mechanism will not go through its automatic cycle, whereby the operator of the machine will become cognizant of the lack of workpieces W. If desired, a microswitch 103 (see Fig. 6) may be mounted in the supply chute 3 for actuation by a third one of a series of workpieces W in the mechanism. Such switch 103 when no third workpiece is present may actuate a visual or audible signal device to apprise the operator that additional workpieces W should be loaded into the supply chute 3. The supply chute 3 may, of course, be of length to accommodate a desired number of workpieces or if desired an automatic supply hopper may be used for orienting the workpieces and for automatically keeping the chute 3 filled. In that event the chute 3 need not be of any great length.

Other modes of applying the principle of the invention may be employed, change being made as regards the details described, provided the features stated in any of the following claims, or the equivalent of such, be employed.

We therefore particularly point out and distinctly claim as our invention:

1. In an automatic loading and unloading mechanism, the combination of a workpiece support, a chuck operative to grip a workpiece loaded on said support, chuck reciprocating means for advancing said chuck and the workpiece gripped thereby to a work station whereat the workpiece is presented to a tool and for retracting said chuck and the completed workpiece away from the work station, means operated by retraction movement of said chuck to actuate the latter to release its grip on the workpiece, a stripper disposed in the path of retraction movement of the workpiece to strip it from said chuck upon continued retraction movement of said chuck, a supply chute from which workpieces are successively loaded on said support, and an escapement mechanism on said chute and actuating means therefor operated by a workpiece on said support to actuate said escapement mechanism to hold back a succeeding workpiece and subsequently operated by retraction movement of said chuck to actuate said escapement mechanism to release such succeeding workpiece for loading on said support.

2. In an automatic loading and unloading mechanism, the combination of a workpiece support, a chuck operative to grip a workpiece loaded on said support, chuck reciprocating means for advancing said chuck and the workpiece gripped thereby to a work station whereat the workpiece is presented to a tool and for retracting said chuck and the completed workpiece away from the work station, means operated by retraction movement of said chuck to actuate the latter to release its grip on the workpiece, a stripper disposed in the path of retraction movement of the workpiece to strip it from said chuck upon continued retraction movement of said chuck and automatic sequence control means for actuating said chuck to grip the workpiece, on said support, for actuating said chuck reciprocating means to advance said chuck and the workpiece gripped thereby to such work station and to retract said chuck and the workpiece gripped thereby, and for actuating said chuck during its retraction movement to release its grip on the workpiece for stripping the latter by said stripper from said chuck upon continued retraction movement thereof.

3. In an automatic loading and unloading mechanism, the combination of a workpiece support, a chuck operative to grip a workpiece loaded on said support, chuck reciprocating means for advancing said chuck and the workpiece gripped thereby to a work station whereat the workpiece is presented to a tool and for retracting said chuck and the completed workpiece away from the work station, means operated by retraction movement of said chuck to actuate the latter to release its grip on the workpiece, a stripper disposed in the path of retraction movement of the workpiece to strip it from said chuck upon continued retraction movement of said chuck, said stripper comprising a swingably mounted member which is swung out of the way by the workpiece as said chuck and the workpiece gripped thereby are advanced to the work station, and means for swinging said member into the path of retraction movement of the workpiece after the workpiece has moved therepast as aforesaid.

4. In an automatic loading and unloading mechanism, the combination of a workpiece support, a chuck operative to grip a workpiece loaded on said support, chuck reciprocating means for advancing said chuck and the workpiece gripped thereby to a work station whereat the workpiece is presented to a tool and for retracting said chuck and the completed workpiece away from the work station, means operated by retraction movement of said chuck to actuate the latter to release its grip on the workpiece, a stripper disposed in the path of retraction movement of the workpiece to strip it from said chuck upon continued retraction movement of said chuck, said stripper comprising first and second swingably mounted, spring actuated gates disposed successively in front of said support and in the path of advance movement of the workpiece, said first gate being nearest to said support and being engaged by the workpiece for swinging out of the way during advance movement of the workpiece by said chuck, and a cam on said chuck for engaging said second gate for swinging it out of the way during such advance movement of said chuck and the workpiece, said first gate, upon movement of the workpiece therepast, being spring actuated into the path of subsequent retraction movement of the workpiece, and said second gate being similarly spring actuated but under the control of said cam whereby the workpiece has a portion thereof disposed between said gates when stripped by said stripper from said chuck.

5. In an automatic loading and unloading mechanism, the combination of a workpiece support, a chuck operative to grip a workpiece on said support and to advance it to a work station and to release the workpiece during retraction movement of said chuck away from the work station, a stripper effective to arrest movement of the workpiece during retraction movement of said chuck whereby the workpiece is stripped from said chuck, said stripper comprising a pair of swingably mounted, spring-actuated members, one of said members being effective to hold a workpiece in a predetermined position with respect to said chuck and being swung in one direction by the workpiece during advancing movement of said chuck, a cam on said chuck effective to swing the other of said members clear of the workpiece during advancing movement of said chuck, said one member being spring returned into the path of return movement of the workpiece after the latter has been advanced past said one member, and said other member being spring returned, under the control of said cam, to eventually contact the workpiece on its forward side to hold it against said one member as said chuck continues its return movement with respect to said members.

6. In combination, a brushing lathe equipped with a rotary power-driven brush, a work holder disposed to one side of said brush, means for advancing said holder toward said brush to present a workpiece on said holder to said brush and for retracting said holder and the brushed workpiece away from said brush, a work support disposed to support a workpiece for removal by said workholder when advanced, means for supplying a workpiece to said support each time that said holder has retracted away from said brush, and a workpiece stripper in front of said support operative to strip the brushed workpiece from said holder during its retraction movement.

7. The combination according to claim 6 characterized further in the provision of a discharge chute in alignment with said stripper for receiving the brushed and stripped workpiece.

8. The combination according to claim 6 characterized further in the provision of a timer and sequence control that is effective to actuate said holder in the stated sequence of movements and to cause said holder to dwell for a predetermined time interval at its advanced position whereat the workpiece is presented to said brush.

9. The combination according to claim 6 characterized further in the provision of drive means for rotating said holder and the workpiece while the workpiece is engaged with said brush.

References Cited in the file of this patent
UNITED STATES PATENTS

| | | |
|---|---|---|
| 1,511,565 | Kingsley | Oct. 14, 1924 |
| 1,964,937 | Dumser et al. | July 3, 1934 |
| 2,101,790 | Cole et al. | Dec. 7, 1937 |
| 2,272,179 | Allardt | Feb. 10, 1942 |
| 2,581,928 | Broden | Jan. 8, 1952 |
| 2,682,065 | Nelson et al. | June 29, 1954 |
| 2,860,355 | Spainhour | Nov. 18, 1958 |